United States Patent [19]

Lawrence

[11] Patent Number: 5,649,473
[45] Date of Patent: Jul. 22, 1997

[54] FOOD PRESS PLATEN COVER SYSTEM

[75] Inventor: Eric Clay Lawrence, South El Monte, Calif.

[73] Assignee: Lawrence Equipment, Inc., South El Monte, Calif.

[21] Appl. No.: 570,625

[22] Filed: Dec. 11, 1995

[51] Int. Cl.[6] .................... A21C 9/08; A47J 37/00
[52] U.S. Cl. .................... 99/349; 99/353; 100/295; 100/326; 100/315; 425/89; 425/364 R; 425/DIG. 55
[58] Field of Search ............ 99/349, 353, 373, 99/372, 377; 100/295, 93 P; 425/89, DIG. 55, 364 R

[56] References Cited

U.S. PATENT DOCUMENTS

| | | | |
|---|---|---|---|
| Re. 34,530 | 2/1994 | Kirkpatrick | 426/502 |
| 2,425,719 | 8/1947 | Berger | 425/89 X |
| 2,886,849 | 5/1959 | Brierley | 425/89 |
| 4,075,359 | 2/1978 | Thulin | 425/89 X |
| 4,353,776 | 10/1982 | Giulie et al. | 100/93 P X |
| 4,905,581 | 3/1990 | Kirkpatrick | 99/353 |
| 5,044,264 | 9/1991 | Forney | 99/349 |
| 5,231,919 | 8/1993 | Lawrence et al. | 99/334 |
| 5,458,051 | 10/1995 | Alden et al. | 99/349 |

*Primary Examiner*—Reginald Alexander
*Attorney, Agent, or Firm*—Lyon & Lyon LLP

[57] ABSTRACT

A platen cover feed system includes a frame supporting a pair of spools. A belt is connected at each end to the spools and can be fed from one spool to the other or vice versa. The spools can be mounted on supports located at the four top corners of the frame, and the rear supports can be adjusted to various heights. The system may include clamps associated with the spools. The clamps can be tightened or loosened manually in order to either fix the belt in place or feed it forward or backward. Thus, the belt can be fed a varying distance in either direction. The belt is generally made of, or coated with, Teflon or a similar non-sticking material.

13 Claims, 2 Drawing Sheets

FOOD PRESS PLATEN COVER SYSTEM

BACKGROUND

In making various food products, such as tortillas, doughballs are typically flattened by a press unit. The doughballs are generally moved on a conveyor belt in the press unit. The conveyor belt pauses as the press platen moves down to flatten the doughballs. See, for example, U.S. Pat. Nos. 4,905,581; 5,231,919 and U.S. Pat. No. Reissue 34,530, incorporated herein by reference.

To prevent the platen surface from sticking to the doughballs, a non-stick platen cover such as Teflon cover has been used. The platen cover is removably attached to the press platen. However, platen covers rapidly wear out under the heat and pressure conditions involved. Further, even when not fully worn out, the platen cover can develop defective areas or holes. Replacing the platen cover is costly and time consuming, and requires that the press stop operation, causing lost production time.

Accordingly, there remains a need for an improved press that allows for rapid, efficient changeover of the cover surface. Similarly, there is a need for a press which can operate automatically for longer periods of time without the need to manually remove and replace the platen cover.

SUMMARY OF THE INVENTION

To these ends a platen cover system preferably includes a frame supporting a pair of spools on opposite sides of the platen. A platen cover belt is advantageously connected at each end to the spools and may be fed from one spool to the other.

In a preferred embodiment, the spools are advantageously mounted on supports at the four top corners of the frame, with the rear supports vertically adjustable. Clamps preferably fix the spools and belt in place or release the spools to allow the belt to advance.

BRIEF DESCRIPTION OF THE DRAWINGS

In the drawings, wherein similar reference characters denote similar elements throughout the several views.

DETAILED DESCRIPTION OF THE DRAWINGS

Figure 1:
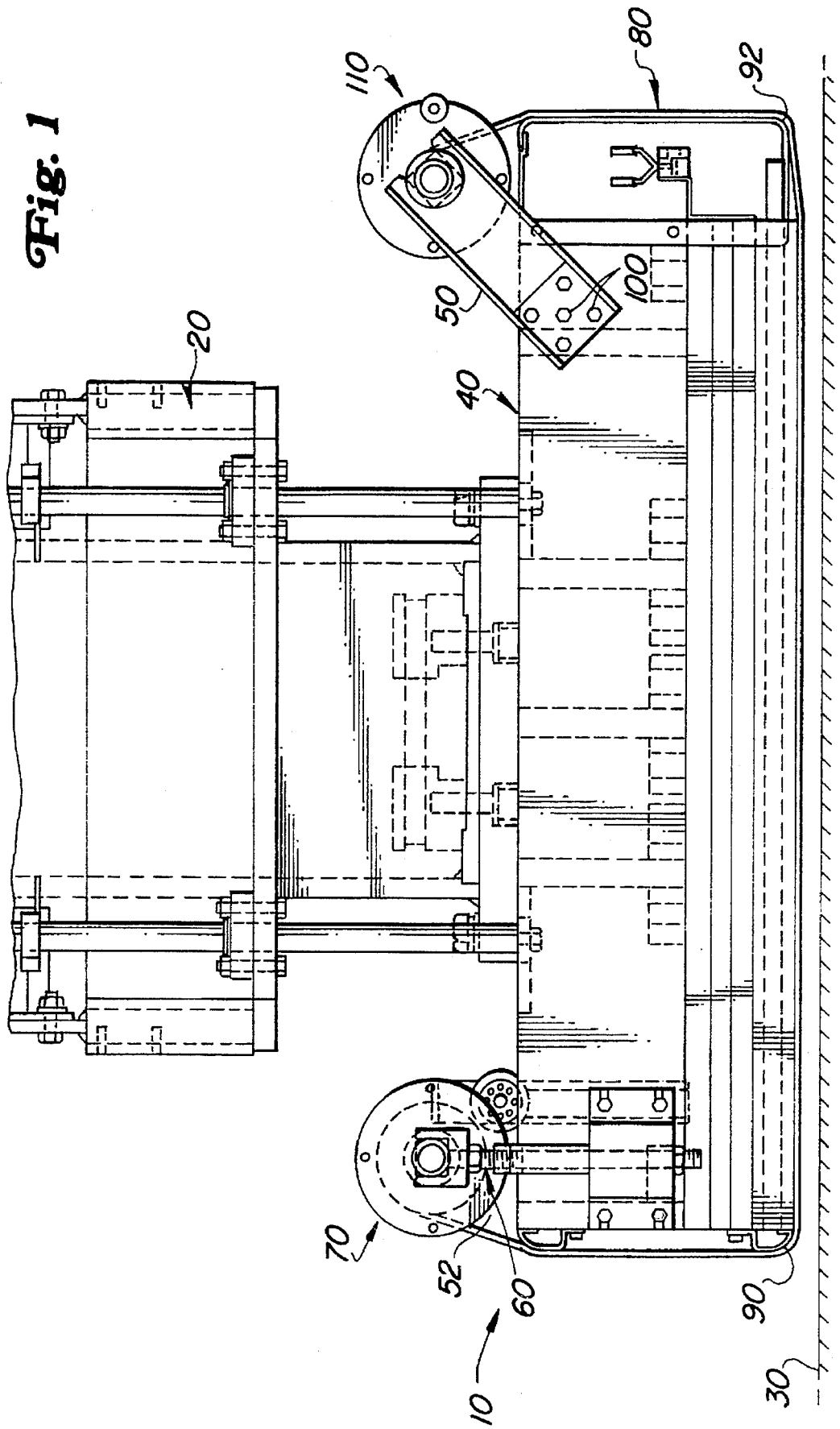
FIG. 1 is a side view of the present platen cover system on a food press.

Turning now in detail to the drawings, a platen cover system 10 is installed on a doughball press unit 20 having a conveyor 30 and a support frame 40. Left and right side struts 50 and 52 are mounted on the support frame 40 at the upper corners. Externally threaded support members or jacking posts 60 and 62 extend upwardly from the rear corners of the support frame 40. A rear spool 70 is rotatably attached to the ends of the externally threaded support members 60 and 62. A front spool 110 is similarly mounted at the ends of the front struts 50.

A platen cover belt 80 is wound up on the front spool 110, passes under the platen and is connected to the rear spool 70. The platen has radiused front and rear ends 90 and 92 to provide a smooth sliding surface for the belt 80. The belt 80 matches the width of the platen. The belt 80 is preferably made of a non-stick material such as Teflon or a Teflon coated material, or an equivalent. The belt 80 is preferably long enough so that it can be advanced to provide a new platen surface cover many times without replacement.

Figure 2:
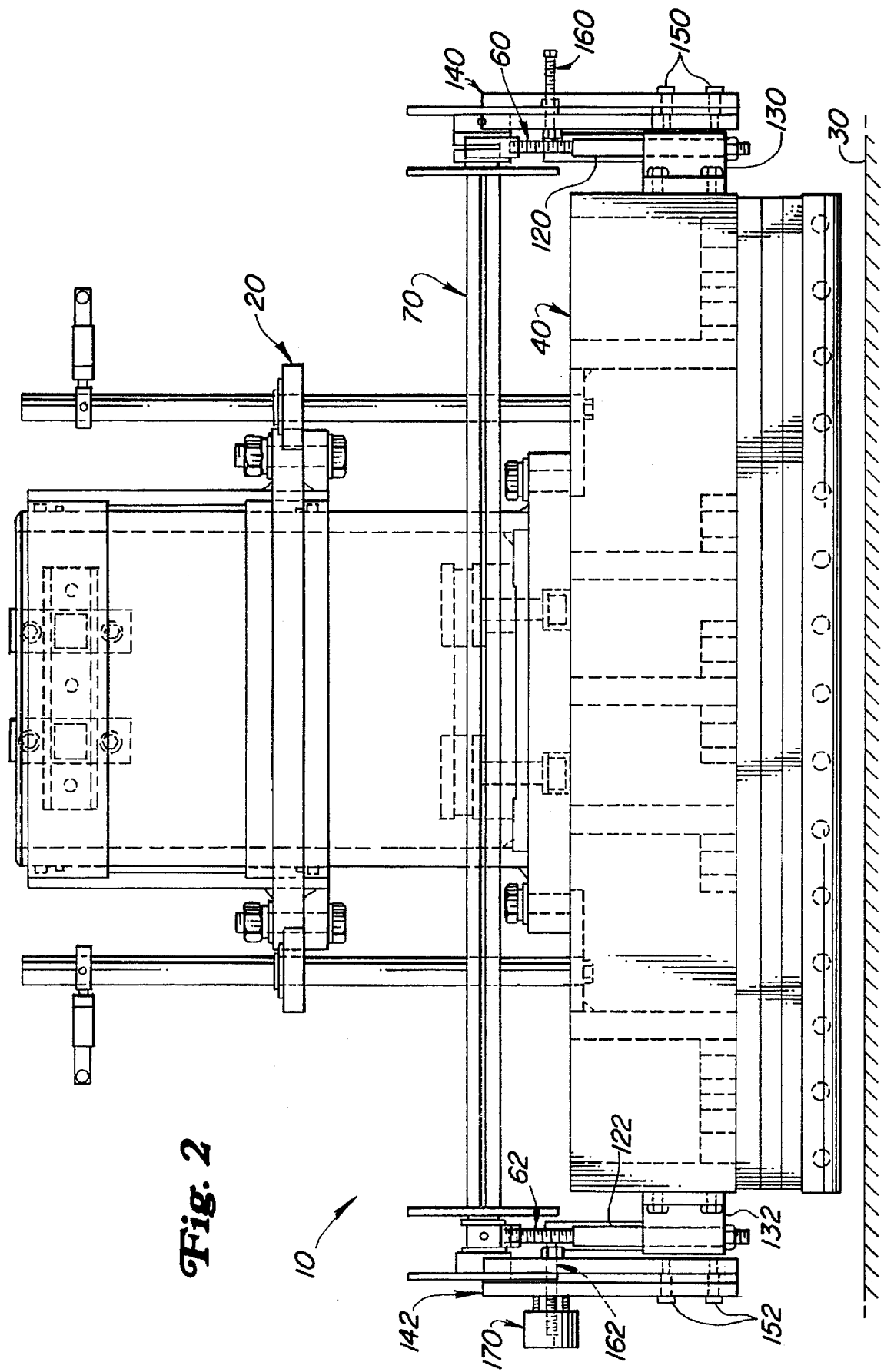
FIG. 2 is a rear end view of the system of FIG. 1.

The rear spool 70 is supported on the jacking posts 60 and 62, which are threaded into sleeves 120 and 122. Referring to FIG. 2, the sleeves 120 and 122 are connected to flanges 130 and 132 joined to the sides of the support frame 40. Clamps 140 and 142 are attached to the flanges 130 and 132 with screws 150 and 152. The clamps 140 and 142 extend upwardly with inner surfaces adjacent the ends of the rear spool 70. Externally threaded bolts 160 and 162 extend through the clamps 140 and 142. A handle 170 is attached to one of the externally threaded bolts 162.

In operation, the platen cover system 10 uses a non-stick-surface belt 80 that covers the platen and is pressed down onto doughballs on the conveyor 30 underneath, flattening the doughballs into e.g., tortillas, pizzas, etc. The belt 80 provides a non-sticking surface covering the platen to prevent the doughballs from sticking. The tension in the belt 80 may be adjusted by turning the jacking posts 60 and 62 or by tightening one of the spools.

When the belt 80 wears out, it can be manually fed forward until the worn section is wound onto the take-up reel and a new section of belt covers the platen. Further, if defective spots form in the belt 80, it can be moved by an amount necessary to index the bad areas to positions not over a tortilla landing/pressing position. The belt 80 may be advanced by turning the spools, either by hand, or with an automatic or motorized system actuated by pressing cycle count, time, or other parameter. The belt 80 feeds from the rear spool 70 to the front spool 110, although the direction of feed can be reversed so that the belt 80 feeds from the front spool 110 to the rear spool 70. The belt may be advanced in a single direction, or alternatively in both front/back directions. The clamps 140 and 142 can be manually tightened or loosened by turning the handle 170 to lock the belt in place, and to free the belt so it can be advanced.

While a preferred embodiment has been shown and described, numerous alterations may be made without departing from the spirit or scope of the invention. Therefore, the invention is not to be limited except in accordance with the following claims.

I claim:

1. In a food press of the type having a platen which moves up and down to press doughballs on a conveyor, the improvement comprising:

a frame attached to the platen;

first and second spools rotatably supported by said frame; and a belt attached to said first spool extending across a pressing surface of the platen, and attached to said second spool, with the belt moving up and down with the platen.

2. The food press of claim 1 wherein said belt is made of, or coated by, a non-sticking material.

3. The food press of claim 2 wherein the material comprises Teflon.

4. The food press of claim 1 further comprising means for preventing rotation of the spools.

5. The food press of claim 1 further comprising means for adjusting the vertical position of said first spool.

6. The food press of claim 5 wherein said means for adjusting comprises first and second externally threaded support members inside first and second internally threaded sleeves, said first and second sleeves mounted on said frame, and said externally threaded support members attached to said first spool.

7. A food press, comprising:

a frame;

a platen on the frame;

first and second front support members mounted on said frame;

first and second rear support members mounted on said frame, said first and second rear support members being vertically adjustable;

a front spool rotatably attached to said first and second front support members;

a rear spool rotatably attached to said first and second rear support members; and a belt having first and second ends connected to said rear and front spools, respectively, and passing under said platen.

8. The food press of claim 7 wherein said platen has rounded front and rear edges.

9. In a food press of the type having a platen which presses dough balls on a conveyor, the improvement comprising:

a frame attached to the platen;

first and second spools rotatably supported by said frame;

a belt attached to said first spool extending across a pressing surface of the platen, and attached to said second spool; and means for adjusting the vertical position of said first spool, including first and second threaded support members engaged to first and second threaded sleeves mounted on said frame, and said threaded support members attached to said first spool.

10. The food press of claim 9 wherein said belt is made of, or coated by, a non-sticking material.

11. In a food press of the type having a platen which presses dough balls on a conveyor, the improvement comprising:

a frame attached to the platen;

first and second spools rotatably supported by said frame; and a belt attached to said first spool extending across a pressing surface of the platen, and attached to said second spool with the platen having radiused front and rear ends to provide smooth sliding surface for the belt.

12. The food press of claim 11 wherein said belt is made of, or coated by, a non-sticking material.

13. The food press of claim 11 further comprising means for adjusting the vertical position of said first spool.

* * * * *